(12) United States Patent
Varnhagen et al.

(10) Patent No.: US 10,703,359 B2
(45) Date of Patent: Jul. 7, 2020

(54) CONTROLLING VEHICLE ORIENTATION

(71) Applicant: Ford Global Technologies, LLC, Dearborn, MI (US)

(72) Inventors: Scott Varnhagen, Ann Arbor, MI (US); Schuyler Cohen, Ann Arbor, MI (US); Johannes Strom, Ferndale, MI (US); Ghassan Atmeh, Detroit, MI (US); Alice Kassar, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 109 days.

(21) Appl. No.: 15/417,920

(22) Filed: Jan. 27, 2017

(65) Prior Publication Data

US 2018/0215373 A1    Aug. 2, 2018

(51) Int. Cl.
| | |
|---|---|
| *B60W 30/02* | (2012.01) |
| *B60W 50/00* | (2006.01) |
| *B60N 3/00* | (2006.01) |
| *B60W 40/10* | (2012.01) |

(52) U.S. Cl.
CPC ............ *B60W 30/02* (2013.01); *B60N 3/001* (2013.01); *B60W 30/025* (2013.01); *B60W 40/10* (2013.01); *B60W 50/0097* (2013.01); *B60W 2552/15* (2020.02); *B60W 2552/30* (2020.02); *B60W 2552/35* (2020.02); *B60W 2556/50* (2020.02)

(58) Field of Classification Search
CPC ............... B60W 30/02; B60W 40/10; B60W 2550/147; B60W 2550/146; B60W 2550/142; B60W 50/0097; B60W 30/025; B60W 2550/402; B60W 2550/14; B60W 50/0098; B60W 40/06; B60W 10/22; B60N 3/001; B60G 17/0165
See application file for complete search history.

(56) References Cited

U.S. PATENT DOCUMENTS

| | | | |
|---|---|---|---|
| 3,183,016 A | 5/1965 | Gustafsson | |
| 3,811,329 A | 5/1974 | White | |
| 4,975,849 A | 12/1990 | Ema | |
| 6,092,005 A * | 7/2000 | Okada | G01P 15/00 340/439 |

(Continued)

FOREIGN PATENT DOCUMENTS

| | | |
|---|---|---|
| DE | 102012004201 A1 | 10/2012 |
| DE | 102013210553 A1 | 12/2014 |
| WO | 2016134811 A1 | 9/2016 |

OTHER PUBLICATIONS

Search Report from United Kingdom Intellectual Property Office dated Jul. 16, 2018 regarding Application No. GB1801240.1 (5 pages).

*Primary Examiner* — Jeffrey C Boomer
(74) *Attorney, Agent, or Firm* — Frank A. MacKenzie; Bejin Bieneman PLC

(57) ABSTRACT

A computer is programmed to predict, based at least in part on a stored road topology for a predetermined vehicle route, a vehicle body orientation based on lateral, longitudinal, and vertical accelerations predicted for the route. The computer is programmed to, based on the predicted vehicle body orientation, adjust at least one of an orientation of the vehicle body and an orientation of an object in the vehicle as the vehicle traverses the route.

14 Claims, 5 Drawing Sheets

(56) References Cited

U.S. PATENT DOCUMENTS

| | | | |
|---|---|---|---|
| 7,729,829 B2 * | 6/2010 | Messih | B60R 21/0132 180/282 |
| 8,880,292 B2 | 11/2014 | Shiozawa et al. | |
| 2005/0278094 A1 * | 12/2005 | Swinbanks | B63B 17/0081 701/37 |
| 2006/0069467 A1 | 3/2006 | Fischer et al. | |
| 2006/0253240 A1 * | 11/2006 | Rao | B60W 50/0205 701/48 |
| 2010/0263167 A1 | 10/2010 | Fox | |
| 2010/0263463 A1 | 10/2010 | Janosik | |
| 2012/0130611 A1 * | 5/2012 | Al Alam | B60W 30/188 701/70 |
| 2013/0164712 A1 * | 6/2013 | Hunt | B60W 40/09 434/65 |
| 2014/0195112 A1 * | 7/2014 | Lu | B60G 17/015 701/37 |
| 2014/0297116 A1 * | 10/2014 | Anderson | H02K 5/12 701/37 |
| 2015/0094927 A1 * | 4/2015 | Takahashi | B60W 30/025 701/93 |
| 2015/0158487 A1 | 6/2015 | Siedersberger | |
| 2015/0274105 A1 * | 10/2015 | Le Merrier | B60R 21/013 701/45 |
| 2016/0082870 A1 * | 3/2016 | Fujita | B60N 2/501 248/561 |
| 2016/0318513 A1 * | 11/2016 | Lee | B60W 30/143 |
| 2016/0325753 A1 * | 11/2016 | Stein | B60W 40/06 |
| 2017/0136842 A1 * | 5/2017 | Anderson | B60G 17/016 |
| 2018/0079272 A1 * | 3/2018 | Aikin | B60G 17/0165 |
| 2018/0154723 A1 * | 6/2018 | Anderson | H02K 5/12 |

* cited by examiner

US 10,703,359 B2

CONTROLLING VEHICLE ORIENTATION

BACKGROUND

Driving a vehicle over road bumps, potholes, etc., may result in positive and/or negative force(s) to a vehicle body and/or objects inside the vehicle. Moreover, when a vehicle brakes and/or steers, the vehicle body may accelerate in one or more directions. The vehicle body and/or objects in the vehicle may experience shock, vibration, etc., caused by such accelerations. Moreover, such accelerations typically result in a change of a yaw, a roll, a pitch, a vertical position, etc., of the vehicle body and/or objects in the vehicle.

DETAILED DESCRIPTION

Introduction

Referring to Figures, a computer 110 is programmed to predict, based at least in part on a stored road 205 topology for a predetermined vehicle 100 route, a vehicle 100 body 105 orientation based on lateral, longitudinal, and vertical accelerations $a_{Lat}$, $a_{Long}$, $a_{Ver}$ predicted for the route. The computer is programmed to modify at least one of an orientation of the vehicle 100 body 105 and an orientation of an object, e.g., a table 140, in the vehicle 100, based on the predicted vehicle 100 body 105 orientation, as the vehicle 100 traverses the route.

Exemplary System Elements

Figure 1:
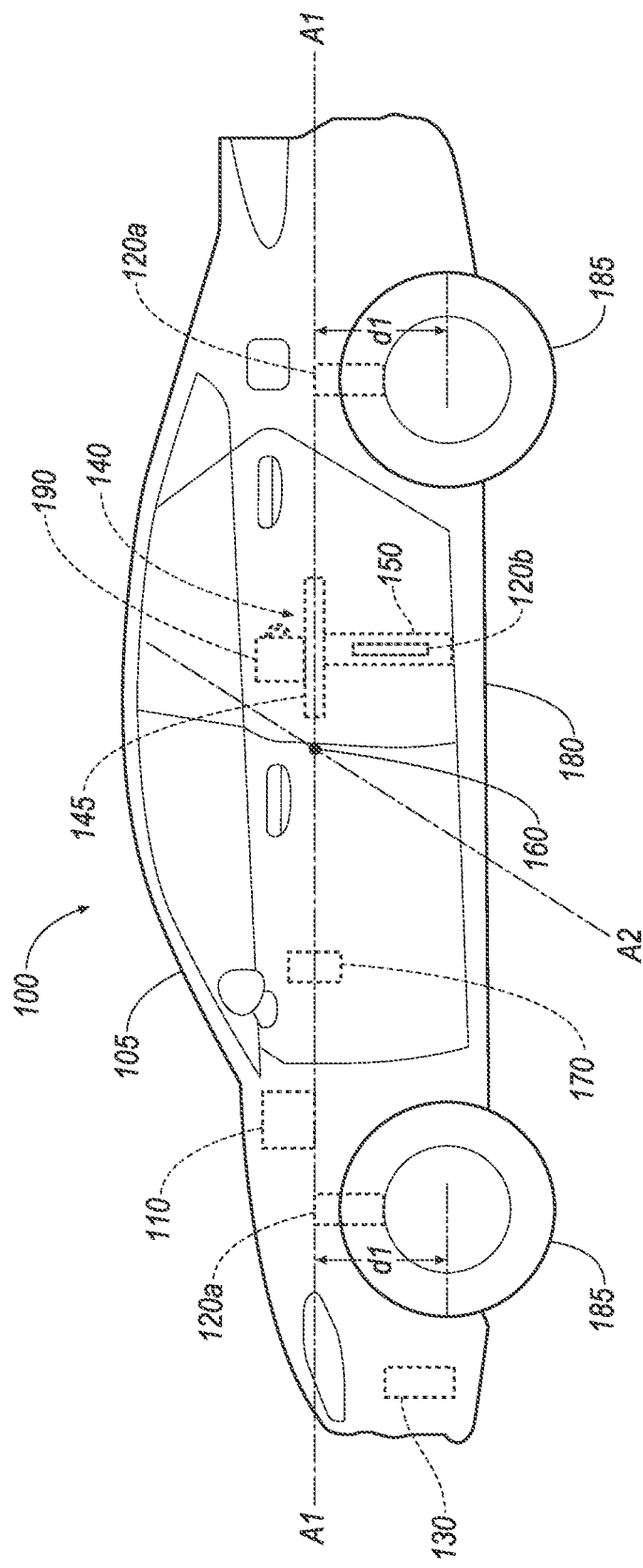
FIG. 1 is a side view of an example vehicle with a table mounted to a vehicle body.

FIG. 1 illustrates a vehicle 100. The vehicle 100 may be powered in a variety of known ways, e.g., with an electric motor and/or internal combustion engine. The vehicle 100 may be a land vehicle such as a car, truck, etc. A vehicle 100 may include a body 105, a computer 110, actuator(s) 120a, 120b, sensor(s) 130, a table 140 with a top surface 145 and a pedestal 150, a floor 180, and a human machine interface (HMI) 170. A vehicle 100 has a geometrical center point 160, e.g., points at which respective longitudinal and lateral center lines A1, A2 of the vehicle 100 intersect.

The computer 110 includes a processor and a memory such as are known. The memory includes one or more forms of computer-readable media, and stores instructions executable by the computer 110 for performing various operations, including as discussed herein.

The computer 110 may operate the respective vehicle 100 in an autonomous or a semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicle 100 propulsion, braking, and steering.

The computer 110 may include programming to operate one or more of land vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle 100 and/or receive messages from the various devices, e.g., an actuator 120a, 120b, a sensor 130, an HMI 170, etc. Alternatively or additionally, in cases where the computer 110 actually comprises multiple devices, the vehicle 100 communication network may be used for communications between devices represented as the computer 110 in this disclosure. Further, as mentioned below, various controllers and/or sensors may provide data to the computer 110 via the vehicle communication network.

In addition, the computer 110 may be configured for communicating through a vehicle-to-vehicle (V-to-V) wireless communication interface with other vehicles, e.g., via a vehicle-to-vehicle communication network. The V-to-V communication network represents one or more mechanisms by which the computers 110 of vehicles 100 may communicate with other vehicles and may be one or more of wireless communication mechanisms, including any desired combination of wireless (e.g., cellular, wireless, satellite, microwave and radio frequency) communication mechanisms and any desired network topology (or topologies when multiple communication mechanisms are utilized). Exemplary V-to-V communication networks include cellular, Bluetooth, IEEE 802.11, dedicated short range communications (DSRC), and/or wide area networks (WAN), including the Internet, providing data communication services.

The HMI(s) 170 may be configured to receive information from a user, such as a human operator, during operation of the vehicle. Moreover, an HMI 170 may be configured to present information to the user. In one example, the computer 110 may receive, from the HMI 170, a request to level the vehicle 100 floor 180 and/or to stabilize (e.g., prevent a tip-over) an object 190 such as a cup on the vehicle 100 table 140. As one example, an HMI 170 may include a touchscreen, buttons, knobs, keypads, microphone, and so on for receiving information from a user. Moreover, an HMI 170 may include various interfaces such a Ford SYNC® computing interface, a smart phone, etc., for receiving information from a user and/or output information to the user.

The sensors 130 may include a variety of devices known to provide data to the computer 110. For example, the vehicle 100 may include orientation sensor(s) 130 that provide data indicating a current roll, pitch, yaw, and/or vertical position of the vehicle 100 body 105 (see FIGS. 1 and 2A). In another example, the vehicle 100 may include orientation sensor(s) 130 that provide data indicating a current roll, pitch, yaw, vertical position, etc. of the table 140 in the vehicle 100. An orientation sensor 130 may include chips and/or mechanical components.

As another example, the sensors 130 may include Light Detection And Ranging (LIDAR) sensor(s) 130, camera sensors 130, radar sensors 130, etc. disposed in and/or on the vehicle 100 that provide relative locations, sizes, and shapes of other objects such as other vehicles and/or a road topology. A road topology, as that term is used herein, is a set of geometrical properties or characteristics of a road surface. In one example, a road topology may include three dimensional coordinates of a road surface. In another example, a road topology may include location, size, depth, etc. of road bumps, potholes, and/or any other irregularities of a road 205 surface. Yet further alternatively or additionally, a road topology may include a road longitudinal slope, a road lateral slope, road curvature coordinates, and location coordinates of a pothole, bumps, etc. A longitudinal slope is a slope of a road 205 surface in a longitudinal direction of the road 205, whereas, a lateral slope of a road 205 is a slope of the road 205 surface in a direction perpendicular to the longitudinal direction of the road 205.

In one example, a road curvature may be represented by a polynomial of third degree such as $Y=aX+bX^2+cX^3$. Y and X represent longitudinal and lateral coordinates. Parameters a, b, and c of such a polynomial may determine a curvature for the road 205. Additionally or alternatively, road curvature coordinates may represent three dimensional coordinates, i.e., including longitudinal, lateral, and vertical coordinates. In other words, a road curvature may include a horizontal curvature of a road 205 and/or a vertical curvature of the road 205 surface, e.g., a bump.

Figure 2A:
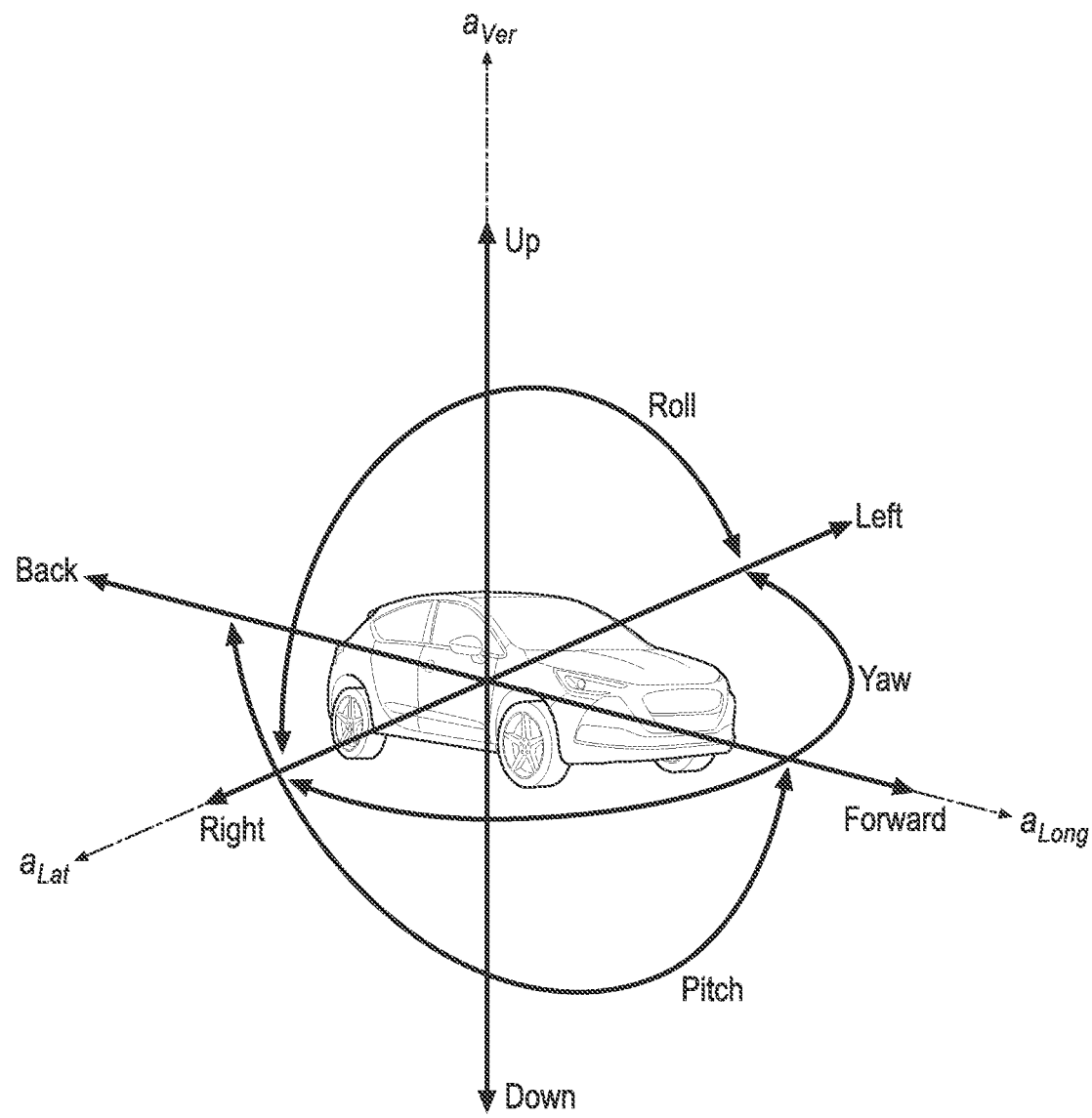
FIG. 2A is perspective view of the vehicle of FIG. 1 with example orientation vectors superimposed thereon.
Figure 2B:
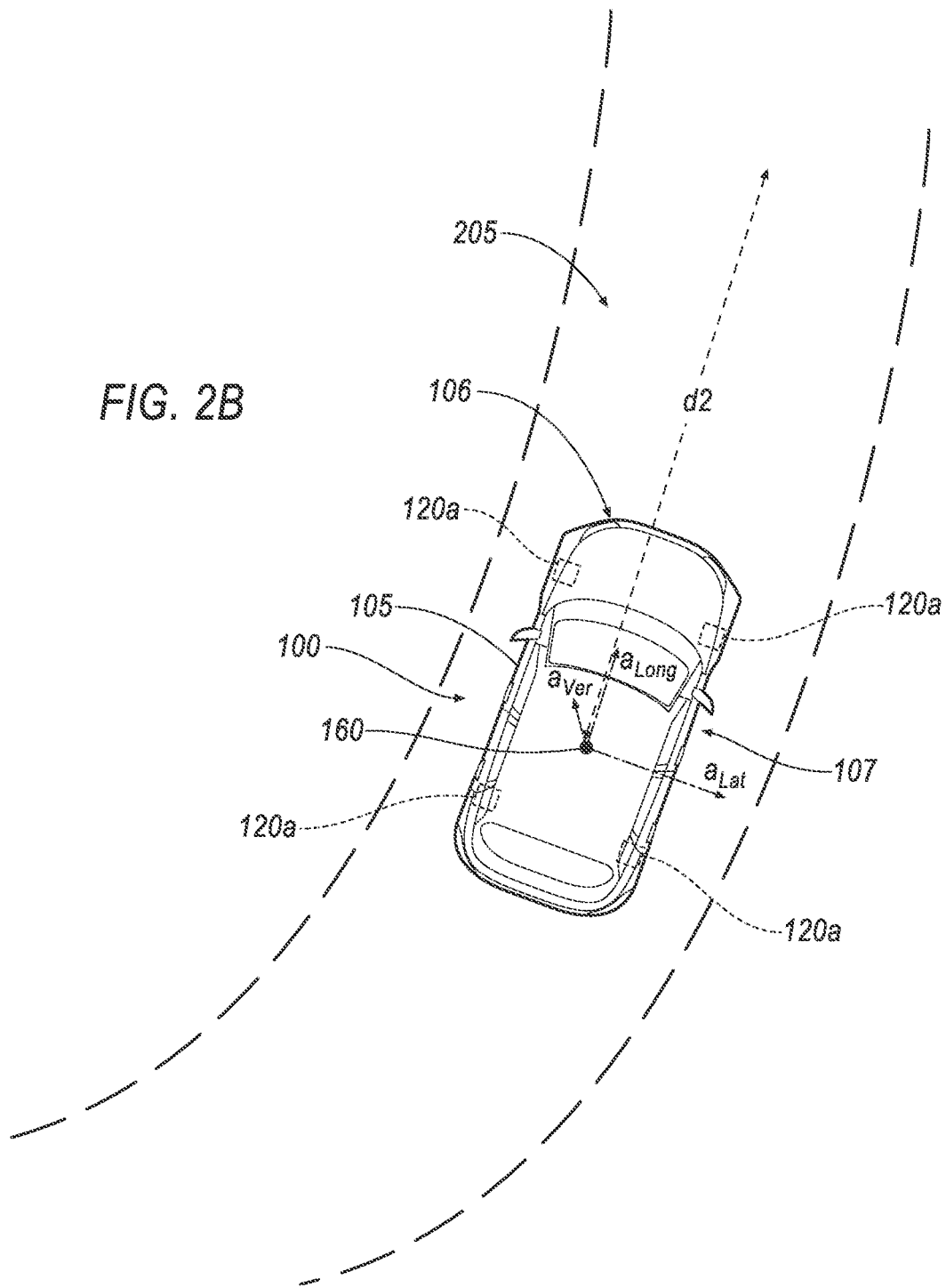
FIG. 2B is a perspective view of the vehicle of FIG. 1 on a road.

For example, a vehicle 100 forward-facing camera sensor 130 may provide data including the road topology of a section of the road 205 in a forward direction of the vehicle 100 up to a distance $d_2$ from the vehicle 100 (see FIG. 2B). Additionally or alternatively, the vehicle 100 sensors 130 may include a global positioning system (GPS) sensor 130 providing global coordinates, movement direction, etc. of the vehicle 100. Thus, the computer 110 may be programmed to determine a road 205 topology based at least on vehicle 100 GPS coordinates, and map data stored in a vehicle 100 computer 110 and/or data received from a remote computer. For example, the vehicle 100 computer 110 may receive road surface three dimensional coordinates, slope, etc. based on map data. Additionally or alternatively, the computer 110 may receive location, size, etc. of road 205 bumps, potholes, etc. from map data and/or a remote computer. For example, the vehicle 100 computer 110 may receive data such as location, size, etc. of bumps, potholes, etc. from a computer of another vehicle via a V-to-V communication network.

The vehicle 100 body 105 may include a roof, a floor 180, and a plurality of pillars. The vehicle 100 body 105 may have a uni-body construction, a body-on-frame construction, or any other suitable construction. The floor 180 may include cross-beams and a floor panel supported on the cross-beams. The vehicle 100 body 105 may be formed of metal, hard plastic, etc.

The vehicle 100 may include a suspension system to, e.g., reduce vehicle 100 noise, vibration, etc. that may be caused by road bumps, potholes, surface irregularities, etc. In one example, a suspension system may include springs, shock absorbers and linkages that mechanically couple a vehicle 100 body 105 to vehicle 100 wheels 185 and allow a relative motion between the vehicle 100 body 105 and the vehicle 100 wheels 185, e.g., to absorb shocks caused by road bumps, a brake operation, etc.

The vehicle 100 may include various actuators that are implemented via circuits, chips, or other electronic and or mechanical components that can actuate various vehicle 100 subsystems in accordance with appropriate control signals as is known. The actuators may be used to control braking, acceleration, and steering of the vehicles 100.

The vehicle 100 may include suspension actuator(s) 120a to move a vehicle 100 wheel 185 relative to the body 105. A suspension actuator 120a may mechanically couple a wheel 185 and the body 105, e.g., in parallel to suspension components such as springs, shock absorbers, etc. A suspension actuator 120a may be electrically coupled to the computer 110, e.g., via a vehicle 100 communication network. In one example, the vehicle 100 includes multiple suspension actuators 120a, each mechanically coupling a wheel 185 to the body 105. For example, the computer 110 may be programmed to actuate individually the suspension actuators 120a to modify a position of the respective wheel 185 relative to the body 105.

Further, the computer 110 may be programmed to actuate a suspension actuator 120a to increase and/or decrease a distance $d_1$ of a wheel 185 center relative to the body 105, e.g., by exerting a linear force that moves a wheel 185 away or toward the body 105. As an example, the distance $d_1$ may be measured relative to a longitudinal plane crossing the body 105. In one example, the computer 110 may actuate a suspension actuator 120a by outputting an instruction including an amount of force, e.g., 100 Newton, a length of displacement, e.g., 5 cm, etc. For example, such instructions may include both positive and negative numbers to indicate a direction of applying force and/or changing of a distance, etc. A suspension actuator 120a may include hydraulic components such as hydraulic cylinders, valves, etc., and/or electromechanical components such as solenoids, motors, etc.

The vehicle 100 table 140 may include a top surface 145 and a pedestal 150 mechanically coupling the table 140 top surface 145 to the vehicle 100 floor 180. Additionally or alternatively, the pedestal 150 may be mounted to a vehicle 100 roof, pillar, etc. The top surface 145 of the table 140 may be round, oval, etc. The table 140 top surface 145 may be movable relative to the vehicle 100 body 105. In one example, the table 140 top surface 145 may be moveably coupled to the pedestal 150. The vehicle 100 may include an actuator 120b to move the top surface 145 relative to the vehicle 100 body 105. For example, the actuator 120b may move the top surface 145 up/down and/or tilt the top surface 145 in a forward, backward, right, and/or left direction relative to the vehicle 100 floor 180. Additionally or alternatively, the vehicle 100 may include an actuator 120b disposed between the pedestal 150 and the vehicle 100 body 105, e.g., floor 180, to move and/or tilt the table 140 relative to the vehicle 100 body 105. The computer 110 may be programmed to actuate the actuator 120b to move the table 140, e.g., to prevent a tip-over of an object 190 such as a cup disposed on the top surface 145. A suspension actuator 120b may include electrical components such as chips, mechanical components such as bearings, slides, etc., and/or electromechanical components such as solenoids, motors, etc.

With reference to FIGS. 1, 2A, and 2B, a vehicle 100 computer 110 may be programmed to predict a vehicle 100 body 105 orientation based on lateral, longitudinal, and vertical accelerations $a_{Lat}$, $a_{Long}$, $a_{Ver}$ predicted for a vehicle 100 route, based at least in part on a stored road 205 topology for a predetermined vehicle 100 route. The computer 110 may modify, based on the predicted vehicle 100 body 105 orientation, at least one of an orientation of the vehicle 100 body 105 and an orientation of an object, e.g., a table 140, in the vehicle 100 as the vehicle 100 traverses the route.

With reference to FIG. 2A, in one example, an orientation of the vehicle 100 body 105 relative to a reference such as ground level includes a scalar three-dimensional vector starting, e.g., at the vehicle 100 center 160, indicating a direction of the body 105 relative to a reference three-dimensional coordinates system. For example, the orientation may include an algebraic sum, such as is known, of various independent vectors, each indicating a direction of the body 105 relative to a respective reference direction, e.g., a pitch, a yaw, and a roll of the vehicle 100 body 105. Additionally or alternatively, the orientation may include a three-dimensional vector including longitudinal, lateral, and vertical X, Y, Z coordinates. Moreover, in one example, an orientation of a vehicle 100 body 105 may further include a vertical position of the vehicle 100 body 105 relative to, e.g., the ground level. For example, a vertical position may be specified as a distance between the vehicle 100 center 160 and the ground level. In another example, an orientation of the table 140 relative to a reference, e.g., the vehicle 100 body 105, the ground level, etc., may include a vertical position, a pitch, a yaw, and a roll of the table 140 relative to the reference.

In one example, the computer 110 may adjust an orientation of the vehicle 100 body 105 by actuating a vehicle 100 front right, front left, rear right, and/or rear left suspension actuator 120a. For example, the computer 110 may be programmed to adjust a vertical position (see up/down direction in FIG. 2A) of the vehicle 100 body 105 by actuating the front right, front left, rear right, and rear left suspension actuators 120a to lift the vehicle 100 body 105, e.g., 2 cm (see FIG. 2B). Thus, a vertical position of the body 105 may be increased by 2 cm. Additionally or alternatively, the computer 110 may be programmed to adjust a body 105 pitch (see FIG. 2A) by actuating the front right and front left suspension actuators 120a to lift a front section 106 of the body 105, e.g., 2 cm. Additionally or alternatively, the computer 110 may be programmed to adjust a vehicle 100 body 105 roll by actuating the front right and rear right suspension actuators 120a to lower a right section 107 of the vehicle 100 body 105, e.g., 2 cm. Additionally or alternatively, the computer 110 may be programmed to adjust the vehicle 100 body 105 by actuating other vehicle 100 actuators and/or using other techniques.

With reference to FIGS. 2A-2B, a vehicle 100 operation such as braking, acceleration, and/or steering, may result in a force to the vehicle 100 body 105 that causes a lateral, longitudinal, and/or vertical acceleration $a_{Lat}$, $a_{Long}$, $a_{Ver}$. For example, a steering operation may cause a lateral acceleration $a_{Lat}$, or a braking operation may cause a longitudinal and/or vertical acceleration $a_{Long}$, $a_{Ver}$. In another example, as the vehicle 100 traverses the road 205, a road 205 topology may result in forces that cause an acceleration on the vehicle 100 body 105 such as a lateral, longitudinal, and/or vertical acceleration $a_{Lat}$, $a_{Long}$, $a_{Ver}$. For example, a bump, a pothole, a curvature, a slope, etc. of a road 205 may cause a lateral, longitudinal, and/or vertical acceleration $a_{Lat}$, $a_{Long}$, $a_{Ver}$.

An orientation of a vehicle 100 body 105 may change due to a lateral, longitudinal, and/or vertical acceleration $a_{Lat}$, $a_{Long}$, $a_{Ver}$. For example, a vehicle 100 body 105 pitch may change due to a longitudinal acceleration $a_{Long}$ caused by a braking operation. As another example, a roll and/or yaw of a vehicle 100 body 105 may change due to negotiating a curve, steering the vehicle 100 to a right/left direction, etc. In another example, a vehicle 100 vertical position and/or pitch may change due to driving over a bump, a pothole, etc.

A vehicle 100 computer 110 may be programmed to determine a route for the vehicle 100 using route planning techniques such as are known. For example, the computer 110 may determine a route based on current vehicle 100 coordinates received from a vehicle 100 GPS sensor 130, destination coordinates entered via a vehicle 100 HMI 170, map data, etc. In one example, the computer 110 may determine and store a road 205 topology for the vehicle 100 route, based on the predetermined vehicle 100 route. In other words, the computer 110 may determine a topology (e.g., surface coordinates, slope, curvature, and/or properties of potholes, bumps, etc.) of the predetermined vehicle 100 route. In one example, the computer 110 may determine the road 205 topology based on data received from vehicle 100 sensors 130, e.g., a camera sensor 130 providing image data from the road 205 (see FIG. 2B). Additionally or alternatively, the computer 110 may determine the road 205 topology based on map data, and/or data received from a remote computer such as another vehicle computer.

Further, the vehicle 100 computer 110 may determine or control one or more vehicle operations based on the predetermined route. For example, the computer 110 may control a vehicle propulsion, braking, and/or steering based at least in part on the predetermined route. Thus, in one example, the vehicle 100 computer 110 may predict a lateral, longitudinal, and/or vertical acceleration $a_{Lat}$, $a_{Long}$, $a_{Ver}$ based on the predetermined vehicle operation. For example, based on location coordinates of a "STOP" sign on the vehicle 100 route, a determined speed of the vehicle 100 prior to a brake operation, a determined brake pressure, and a weight of the vehicle 100 body 105, the computer 110 may predict an acceleration caused by a brake operation at the STOP sign. In another example, the computer 110 may predict an acceleration, e.g. a lateral acceleration $a_{Lat}$, caused by steering of the vehicle 100, e.g., based on the vehicle 100 weight, steering angle, and/or speed of the vehicle 100.

Additionally or alternatively, the vehicle 100 computer 110 may predict a lateral, longitudinal, and/or vertical acceleration $a_{Lat}$, $a_{Long}$, $a_{Ver}$ based on the predetermined road 205 topology of the vehicle 100 route. For example, the computer 110 may predict a lateral acceleration $a_{Lat}$ caused by negotiating a road 205 curvature based on the curvature coordinates, the road 205 lateral slope, etc. In another example, the computer 110 may predict a vertical acceleration $a_{Ver}$ caused by driving over a bump based on data included in the road 205 topology, e.g., a location, a size, a shape of the bump. In another example, in addition to the road 205 topology, the computer 110 may predict an acceleration based on the determined vehicle 100 operation. For example, the computer 110 may predict an acceleration of the vehicle 100 body 105 caused by, e.g., driving over a bump, based on the determined speed of the vehicle 100 when reaching the bump.

As discussed above, an acceleration of the vehicle 100 body 105 may affect an orientation of the vehicle 100 body 105, a table 140, etc. In one example, the computer 110 may predict a future orientation of the vehicle 100 body 105 based on predicted accelerations. For example, the computer 110 may predict a change in a pitch, vertical position, etc. of the vehicle 100 body 105 based on predicted accelerations. Additionally or alternatively, the computer 110 may predict a rate of change (speed) of the orientation of vehicle 100 body 105, a table 140, etc., based on the predicted accelerations and/or determined vehicle operation. For example, the computer 110 may predict a speed of 0.2 radian/second for the speed of changing a body 105 pitch.

Various techniques may be used for predicting a future vehicle orientation. As one example, the computer 110 may use a dynamic state space model, such as is known, to predict an orientation of, e.g., the vehicle 100 body 105, the table 140, etc. A state-space model is a mathematical model of a physical system, e.g., the vehicle 100, and includes a set of inputs, outputs, and state variables. For example, state variables may be related by first-order differential equations.

The computer 110 may be programmed to predict the future vehicle 100 body 105 orientation by receiving a state space model of the vehicle 100 body 105 and identifying a current vehicle 100 body 105 orientation. In one example, the computer 110 may identify a current vehicle 100 body 105 orientation based on data received from vehicle 100 orientation sensor(s) 130. Additionally, the computer 110 may be programmed to identify a current speed and/or acceleration of the vehicle 100 body 105 based on data received from vehicle 100 sensors 130. The computer 110 may be programmed to predict lateral, longitudinal, and vertical accelerations $a_{Lat}$, $a_{Long}$, $a_{Ver}$ and to estimate a change of the current vehicle 100 body 105 orientation based at least in part on the received dynamic model, the identified current vehicle 100 body 105 orientation, and the predicted lateral, longitudinal and vertical acceleration $a_{Lat}$, $a_{Long}$, $a_{Ver}$.

The computer 110 may further be programmed to adjust the orientation of the vehicle 100 body 105 by causing a compensating acceleration of the vehicle 100 body 105 that evens out at least one of the predicted lateral, longitudinal, and vertical accelerations $a_{Long}$, $a_{Lat}$, $a_{Ver}$. For example, the computer 110 may be programmed to minimize accelerations applied to the vehicle 100 body 105 as the vehicle 100 traverses a route. The computer 110 may be programmed to determine an actuation instruction, e.g., an amount and/or direction of applying force, for vehicle 100 actuators such as suspension actuators 120a to minimize accelerations applied to the vehicle 100 body 105, and actuate, e.g., a vehicle 100 suspension actuator 120a, based on the determined actuation instruction. For example, the computer 110 may be programmed to determine an actuation instruction, e.g., a downward force, that evens out an acceleration, e.g., an upward vertical acceleration $a_{Ver}$, caused by vehicle operation, e.g., steering, and/or road 205 topology, e.g., a bump.

Further, the computer 110 may be programmed to adjust the orientation of the vehicle 100 body 105 by leveling the vehicle 100 body 105. In other words, the computer 110 may be programmed to adjust the orientation of the vehicle 100 body 105 in a way that the vehicle 100 body 105 is levelled. "Leveling" as the term is used herein means achieving a 0 (zero) roll and/or 0 (zero) pitch of an object an object such as the body 105, the top surface 145, etc. by adjusting an orientation of the object. The pitch and roll may include respective angles of body 105 longitudinal and lateral axes A1, A2 relative to the ground level. Thus, "leveling" means adjusting an orientation of a component such as the body 105 so that a plane including longitudinal and lateral axes of the component, e.g., body 105 longitudinal and lateral axes A1, A2, is substantially parallel to a ground level. "Leveling" may be performed with reference to an orientation of various components in addition to a vehicle 100 body 105, e.g., a table 140 top surface 145, a vehicle 100 seat, an object 190, etc. Further, leveling generally means a horizontal leveling as just described, but it is possible for the above-described axis to be substantially perpendicular, not parallel to the ground, such that leveling in the context of vertical adjustment means making adjustments to maintain or achieve a vertical position, i.e., substantially perpendicular to the ground, of axes of an object such as the vehicle 100 body 105, the top surface 145, etc.

The computer 110 may be programmed to level the vehicle 100 body 105 based on predicted accelerations caused by vehicle operation and/or road 205 topology. For example, the computer 110 may be programmed to determine an actuation instruction to even out a change of orientation of the vehicle 100 body 105 caused by determined vehicle operation and/or road 205 topology. As one example, the computer 110 may determine an instruction to increase a pitch, e.g., by lifting a front right and a front left suspension actuators 120a, based on predicted change of the vehicle 100 pitch based on a determined vehicle 100 brake operation.

Figure 3:
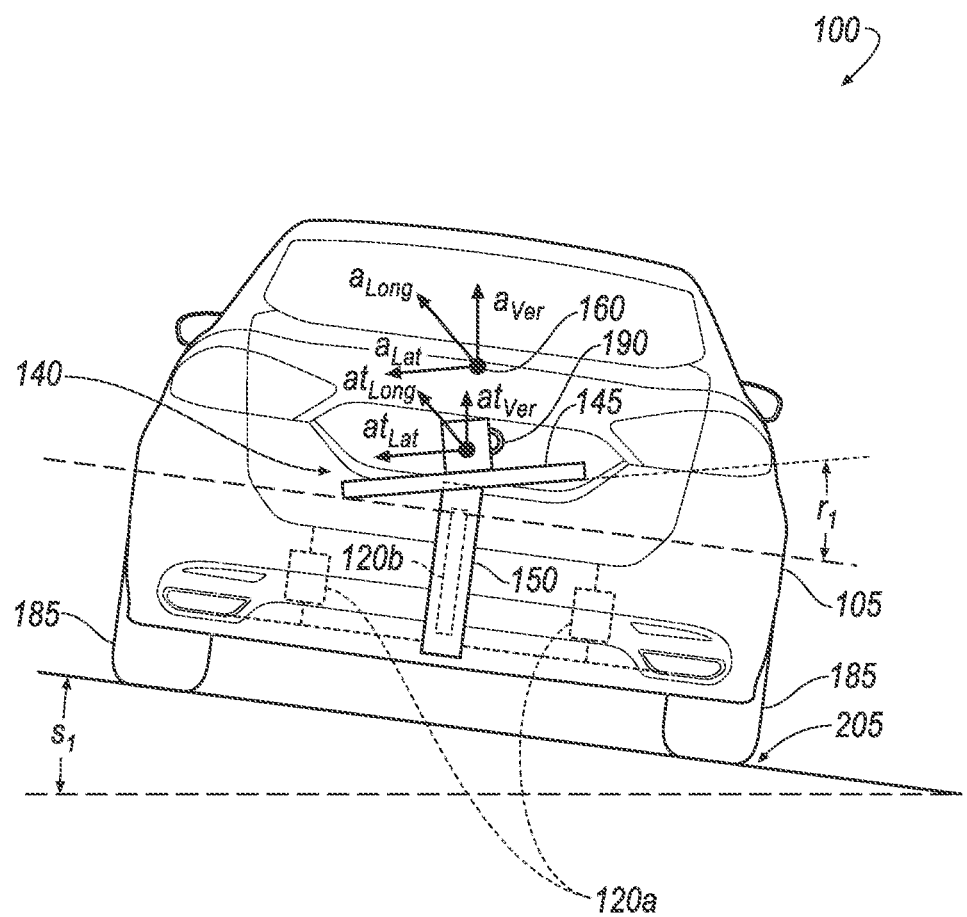
FIG. 3 is a rear view of the vehicle and the table of FIG. 1 on a road.

Referring now to FIG. 3, the computer 110 may be programmed to stabilize, e.g., by preventing a tip-over of, an object 190 in the vehicle 100. For example, the computer 110 may be programmed to receive a dynamic model such as a state-space model, of a table 140 that is movably mounted to the vehicle 100 body 105 and to identify a current table 140 orientation, e.g., based on data provided by an orientation sensor 130 mounted to the table 140, a vehicle 100 camera sensor, an orientation sensor 130 mounted to the pedestal 150, etc. The computer 110 may be programmed to predict a change of the table 140 orientation based on the identified current table 140 orientation and the predicted lateral, longitudinal and/or vertical accelerations $at_{Long}$, $at_{Lat}$, $at_{Ver}$ of, e.g., the top surface 145 and/or the object 190. The computer 110 may be programmed to then adjust the top surface 145 orientation based on the predicted change of the top surface 145 orientation. As stated above, an orientation of the top surface 145 may include a vertical position, a pitch, a yaw, and/or a roll relative to, e.g., the body 105 floor 180, ground level, etc.

The computer 110 may be programmed to predict the lateral, longitudinal and/or vertical accelerations $at_{Long}$, $at_{Lat}$, $a_{Ver}$ based on predicted lateral, longitudinal and/or vertical accelerations $a_{Long}$, $a_{Lat}$, $a_{Ver}$ of the vehicle 100 body 105, physical properties, e.g., weight, size, etc., of the table 140, and/or mechanical properties, e.g., resistance, of a mechanical coupling of the table 140 to the vehicle 100 body 105. Further, the computer 110 may be programmed to adjust the orientation of the table 140 top surface 145 by adjusting at least one of the predicted lateral, longitudinal, and vertical accelerations $at_{Long}$, $at_{Lat}$, $at_{Ver}$, e.g., by actuating at least one of the suspension actuators 120a, 120b.

Additionally or alternatively, the computer 110 may be programmed to adjust the orientation of the top surface 145 and/or the object 190 by leveling the table 140 top surface 145. The computer 110 may level the top surface 145 by adjusting an orientation of at least one of the vehicle 100 body 105 and the table 140. For example, as shown in FIG. 3, the computer 110 may be programmed to actuate the suspension actuator 120b to cause a roll $r_1$ of the top surface 145 based at least in part on a road 205 lateral slope $S_1$. Thus, the roll $r_1$ may advantageously prevent a tip-over of the object 190 as the vehicle traverses a road 205 section with the slope $S_1$. Additionally or alternatively, the computer 110 may be programmed to adjust the table 140 dynamic model based on properties such as size, weight, etc. of the object 190, e.g., based on data received from vehicle 100 sensor(s) 130 such as a camera sensor 130.

Processing

Figure 4:
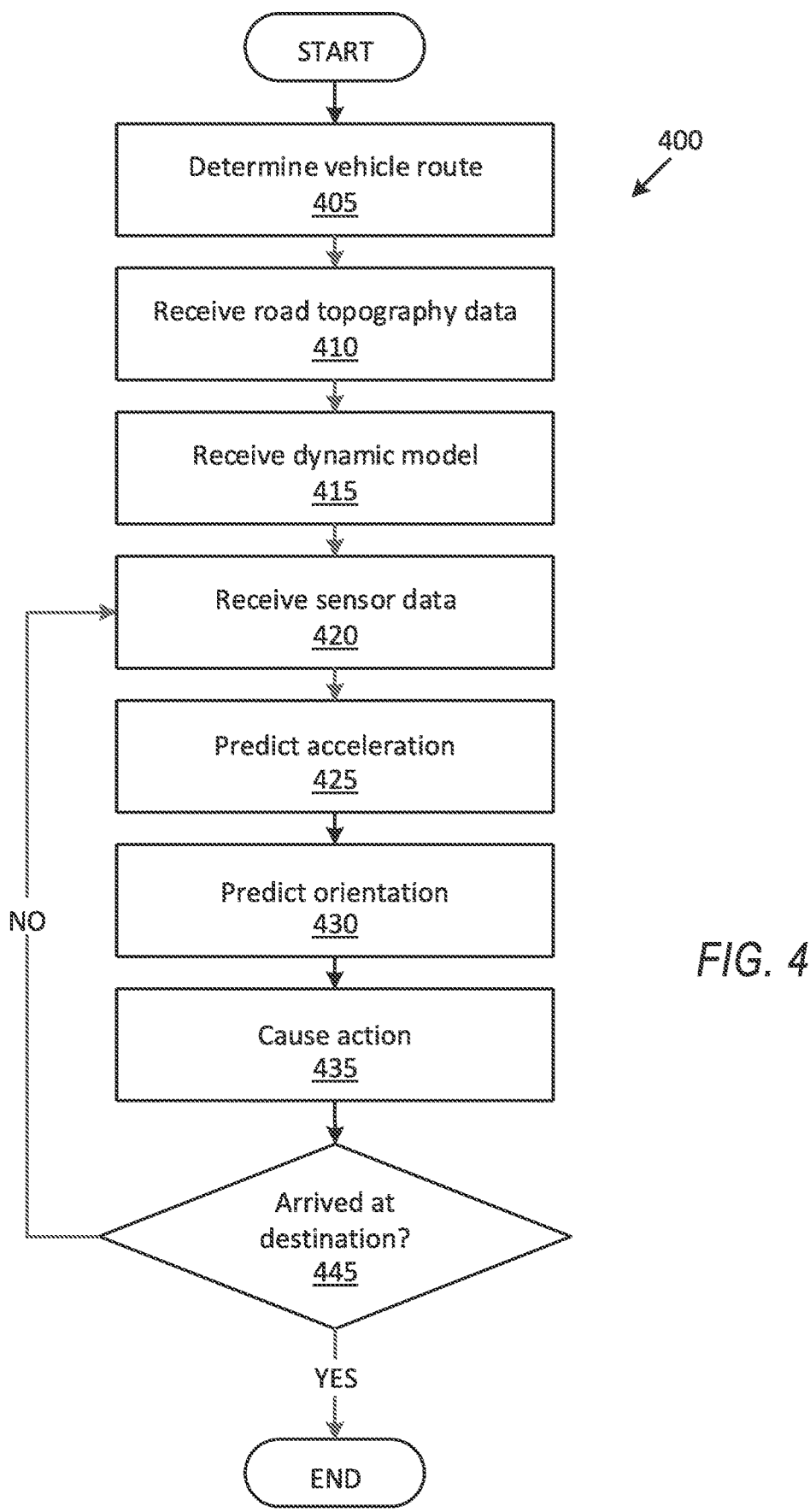
FIG. 4 is a flowchart of an exemplary process for modifying an orientation of a vehicle body and/or an orientation of an object in the vehicle of Figure.

FIG. 4 is a flowchart of an exemplary process 400 for adjusting an orientation of a vehicle 100 body 105, a table 140 top surface 145, and/or an object 190 in the vehicle 100. The vehicle 100 computer 110 may be programmed to execute blocks of the process 400.

The process 400 begins in a block 405, in which the computer 110 determines a vehicle 100 route. For example, the computer 110 determines the route based on location coordinates received from vehicle 100 GPS sensor 130, destination coordinates received from the HMI 170, and/or map data, e.g., stored in the computer 110.

Next, in a block 410, the computer 110 receives road 205 topology data based on the determined route. For example, the computer 110 receives data including location, size, etc. of bumps, potholes, etc., and/or road 205 curvature, surface coordinates, slope, etc.

Next, in a block 415, the computer 110 receives a dynamic model. For example, the computer 110 receives a state space model of a vehicle 100 body 105, a table 140 in the vehicle 100, an object 190, etc. Additionally or alternatively, the computer 110 may receive dynamic model of a combination of the vehicle 100, the table 140, and/or an object 190 in the vehicle 100. The received model may include inputs, e.g., vehicle 100 speed, road 205 topology, etc., outputs such as predicted accelerations, and state variables such as an orientation, an acceleration, etc. of the body 105.

Next, in a block 420, the computer 110 receives sensor data from, e.g., vehicle 100 speed sensor, acceleration sensors 130, orientation sensors 130, etc. For example, a vehicle 100 acceleration sensor 130 may provide one or more of lateral, longitudinal, and/or vertical accelerations $a_{Lat}$, $a_{Long}$, $a_{Ver}$. A vehicle 100 speed sensor 130 may provide one or more of a lateral, longitudinal, and vertical speed of the vehicle 100 body. A vehicle 100 orientation sensor 130 may provide a yaw, a roll, a pitch, and/or a vertical position of the body 105. Additionally or alternatively, one or more sensors 130 may provide orientation, speed, acceleration, etc. of the table 140 and/or an object 190 in the vehicle 100. Additionally or alternatively, the computer 110 may determine one or more of the sensor data, e.g., a yaw, based on data received from a vehicle 100 sensor 130, e.g., a yaw rate sensor 130.

Next, in a block 425, the computer 110 predicts acceleration based on the received dynamic mode, the received road 205 topology, and/or the received sensor data. For example, the computer 110 predicts a vertical acceleration $a_{Ver}$ based on the road 205 topology including properties such as size and location of a bump, the vehicle 100 speed, etc. Additionally or alternatively, the computer 110 predicts a speed, e.g., a vertical speed, i.e., a speed in a direction substantially perpendicular to a horizontal plane, of the body 105, the table 140, etc. based on the received data.

Next, in a block 430, the computer 110 predicts an orientation and/or a rate of change of the orientation of the body 105, the table 140 top surface 145, an object 190, etc. For example, the computer 110 may predict an increase of the vertical position of the body 105 by 3 cm. In another example, the computer 110 may predict a roll of, e.g., 0.2 radian for the table 140 top surface 145 based on a determined vehicle 100 steering operation.

Next, in a block 435, the computer 110 causes one or more actions to adjust an orientation of at least one of the vehicle 100 body 105, the table 140 top surface 145, etc. For example, the computer 110 modifies an orientation to, e.g., level the vehicle 100 body 105, top surface 145, etc. and/or stabilize an object 190 in the vehicle 100. In on example, the computer 110 may estimate a compensating actuation instruction based on the predicted orientation of the vehicle 100 body 105, the top surface 145, etc. The computer 110 then actuates the vehicle 100 actuators, e.g. the suspension actuators 120*a*, 120*b*, based on the estimated compensating actuation. In one example, the computer 110 estimates a compensating actuation, e.g. lifting the front right and front left suspension actuators 120*a* to compensate a pitch of the vehicle 100 body 105 due to a determined vehicle 100 brake operation. In other words, the computer 110 estimates a compensating actuation to level the vehicle 100 body 105. Additionally or alternatively, the computer 110 may estimate a compensating actuation to actuate the suspension actuator 120*b* to, e.g., prevent a tip-over of the object 190 disposed on the table 140 top surface 145.

Next, in a decision block 445, the computer 110 determines whether the vehicle 100 is arrived at the destination, e.g., based on the determined route. If the computer 110 determines that the vehicle 100 is arrived at the destination, then the process 400 ends; otherwise the process 400 returns to the block 420.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A computer, programmed to:
   predict a vehicle body orientation based on (i) lateral, longitudinal, and vertical accelerations predicted for a predetermined route, (ii) a current vehicle body orientation, wherein an orientation includes a roll, a pitch and a yaw; and (iii) a stored road topology for the predetermined vehicle route;
   predict a future actuation of a vehicle brake or steering based on the predetermined vehicle route;
   predict a future lateral, longitudinal, and vertical acceleration based on the predicted future actuation of the vehicle;
   determine a rate of change of the vehicle body orientation including a speed of change of vehicle body pitch based on the predicted future lateral, longitudinal, and vertical acceleration using a state-space model of the vehicle;
   adjust the predicted vehicle body orientation based at least in part on the determined rate of change of the vehicle body orientation;
   based on the adjusted predicted vehicle body orientation, adjust an orientation of the vehicle body as the vehicle traverses the route;
   based on the adjusted predicted vehicle body orientation and an identified current orientation of an object in the vehicle, predict a change of orientation of the object; and
   based on the predicted change of orientation of the object, adjust the orientation of the object.

2. The computer of claim 1, wherein adjusting at least one of the orientation of the vehicle body and the orientation of the object in the vehicle further includes causing a compensating acceleration of at least one of the vehicle body and the object, wherein the compensating acceleration adjusts at least one of the predicted lateral, longitudinal, and vertical accelerations.

3. The computer of claim 1, wherein adjusting at least one of the orientation of the vehicle body and the orientation of the object in the vehicle further includes leveling at least one of the vehicle body and the object.

4. The computer of claim 1, wherein the road topology includes at least one of a road longitudinal slope, a road lateral slope, road curvature coordinates, and location coordinates of a pothole.

5. The computer of claim 1, further programmed to:
   receive a state-space model of a table movably mounted to the vehicle body, the model of the table including a set of inputs, outputs, and state variables describing a table orientation;
   identify a current table orientation;
   predict a change of the table orientation based on the current table orientation and the predicted lateral, longitudinal and vertical accelerations; and
   adjust the table orientation based on the predicted change of the table orientation.

6. The computer of claim 5, further programmed to identify the current table orientation based on data received from a table orientation sensor.

7. The computer of claim 1, further programmed to identify the current orientation of the object in the vehicle based at least in part on data received from an orientation sensor providing a current roll, pitch, yaw, and vertical position of the object relative to the vehicle body.

8. A computer, programmed to:
   predict a vehicle body orientation based on lateral, longitudinal, and vertical accelerations predicted for the route by:
   receiving a state-space model of the vehicle body, the model including a set of inputs, outputs, and state variables describing a vehicle body orientation;
   identifying a current vehicle body orientation based on vehicle sensor data;
   predicting the lateral, longitudinal, and vertical accelerations based on a stored road topology for a predetermined vehicle route;
   estimating a change of the current vehicle body orientation based at least in part on the received state-space model, the identified current vehicle body orientation, and the predicted lateral, longitudinal and vertical accelerations;
   predict a future actuation of a vehicle brake or steering based on the predetermined vehicle route;
   predict a future lateral, longitudinal, and vertical acceleration based on the predicted future actuation of the vehicle including braking;
   determine a rate of change of the vehicle body orientation including a speed of change of vehicle body pitch based on the predicted future lateral, longitudinal, and vertical acceleration using the state-space model of the vehicle;
   adjust the predicted vehicle body orientation based at least in part on the determined rate of change of the vehicle body orientation
   based on the adjusted predicted vehicle body orientation, adjust at least one of an orientation of the vehicle body and an orientation of an object in the vehicle as the vehicle traverses the route,
   based on the adjusted predicted vehicle body orientation and an identified current orientation of an object in the vehicle, predict a change of orientation of the object; and
   based on the predicted change of orientation of the object, adjust the orientation of the object.

9. The computer of claim 8, wherein adjusting at least one of the orientation of the vehicle body and the orientation of the object in the vehicle further includes causing a compensating acceleration of at least one of the vehicle body and the object, wherein the compensating acceleration adjusts at least one of the predicted lateral, longitudinal, and vertical accelerations.

10. The computer of claim 8, wherein adjusting at least one of the orientation of the vehicle body and the orientation of the object in the vehicle further includes leveling at least one of the vehicle body and the object.

11. The computer of claim 8, wherein an orientation includes a roll, a pitch, a vertical position, and a yaw.

12. The computer of claim 8, wherein the road topology includes at least one of a road longitudinal slope, a road lateral slope, road curvature coordinates, and location coordinates of a pothole.

13. The computer of claim 8, further programmed to:
receive a state-space model of a table movably mounted to the vehicle body, the model of the table including a set of inputs, outputs, and state variables describing a table orientation;
identify a current table orientation based on data received from a table orientation sensor;
predict a change of the table orientation based on the current table orientation and the predicted lateral, longitudinal and vertical accelerations; and
adjust the table orientation based on the predicted change of the table orientation.

14. The computer of claim 8, further programmed to identify the current orientation of the object in the vehicle based at least in part on data received from an orientation sensor providing a current roll, pitch, yaw, and vertical position of the object relative to the vehicle body.

* * * * *